US011829869B2

(12) United States Patent
Lacoste et al.

(10) Patent No.: US 11,829,869 B2
(45) Date of Patent: Nov. 28, 2023

(54) MULTIPLE TASK TRANSFER LEARNING

(71) Applicant: ELEMENT AI INC., Montreal (CA)

(72) Inventors: Alexandre Lacoste, Montreal (CA);
Boris Oreshkin, Montreal (CA)

(73) Assignee: ServiceNow Canada Inc., Montréal (CA)

( * ) Notice: Subject to any disclaimer, the term of this patent is extended or adjusted under 35 U.S.C. 154(b) by 1155 days.

(21) Appl. No.: 16/522,374

(22) Filed: Jul. 25, 2019

(65) Prior Publication Data

US 2020/0034694 A1 Jan. 30, 2020

Related U.S. Application Data

(60) Provisional application No. 62/703,046, filed on Jul. 25, 2018.

(51) Int. Cl.
| | | |
|---|---|---|
| *G06N 3/04* | (2023.01) | |
| *G06K 9/62* | (2022.01) | |
| *G06V 30/00* | (2022.01) | |
| *G06N 3/08* | (2023.01) | |
| *G06F 18/20* | (2023.01) | |
| *G06F 18/214* | (2023.01) | |
| *G06N 3/045* | (2023.01) | |
| *G06V 10/82* | (2022.01) | |
| *G06V 30/24* | (2022.01) | |
| *G06V 30/10* | (2022.01) | |

(52) U.S. Cl.
CPC .......... *G06N 3/08* (2013.01); *G06F 18/2148* (2023.01); *G06F 18/285* (2023.01); *G06N 3/045* (2023.01); *G06V 10/82* (2022.01); *G06V 30/10* (2022.01); *G06V 30/2528* (2022.01)

(58) Field of Classification Search
CPC . G06N 3/0454; G06K 9/6227; G06V 30/2528
USPC ........................................... 706/15
See application file for complete search history.

(56) References Cited

U.S. PATENT DOCUMENTS

| | | | | |
|---|---|---|---|---|
| 10,499,081 | B1 * | 12/2019 | Wang ...................... | G06N 3/084 |
| 2011/0302111 | A1 * | 12/2011 | Chidlovskii ........... | G06N 20/00 |
| | | | | 706/46 |
| 2014/0358831 | A1 * | 12/2014 | Adams ................... | G06N 5/048 |
| | | | | 706/20 |
| 2018/0293713 | A1 * | 10/2018 | Vogels ...................... | G06N 3/08 |
| 2019/0042945 | A1 * | 2/2019 | Majumdar ............. | G06N 3/084 |
| 2020/0133741 | A1 * | 4/2020 | Lie .......................... | G06N 3/063 |

OTHER PUBLICATIONS

Ba, J.L., et al. "Layer Normalization" 2016, arXiv preprint arXiv. 14 Pages.

(Continued)

*Primary Examiner* — Jeffery A Williams
(74) *Attorney, Agent, or Firm* — Fasken Martineau DuMoulin, LLP

(57) ABSTRACT

Systems and methods relating to multitask transfer learning. Neural networks are used to accomplish a number of tasks and the results of these tasks are used to determine parameters common to these and other tasks. These parameters can then be used to accomplish other related tasks. In the description, data fitting as well as image related tasks are used. Task conditioning as well as the use of a KL regularizer have greatly improved results when testing the methods of the invention.

16 Claims, 3 Drawing Sheets

(56) References Cited

OTHER PUBLICATIONS

Bakker, B., et al. "Task Clustering and Gating for Bayesian Multitask Learning" Journal of Machine Learning Research 4 (2003), May 2003. 17 Pages.
Bauer, M., et al. "Discriminative k-shot learning using probabilistic models" 2017, arXiv preprint arXiv. 29 Pages.
Berkenkamp, F., et al. "Safe Model-based Reinforcement Learning with Stability Guarantees" 2017, 31st Conference on Neural Information Processing Systems, NIPS 2017. 11 Pages.
Blundell, C., et al. "Weight Uncertainty in Neural Networks" 2015, 32nd International Conference on Machine Learning. arXiv preprint arXiv. 10 Pages.
Bouchacourt D., et al. "Multi-Level Variational Autoencoder: Learning Disentangled Representations from Grouped Observations" 2017, arXiv preprint arXiv. 20 Pages.
Damianou, A. C., et al. "Deep Gaussian Processes" 2013, 16th International Conference on Artificial Intelligence and Statistics (AISTATS). 9 Pages.
Daume III, H. "Bayesian Multitask Learning with Latent Hierarchies" 2009, UAI 2009, 8 Pages.
De Vries, H., et al. "Modulating early visual processing by language" 2017, Advances in Neural Information Processing Systems. 11 Pages.
Edwards, H., et al. "Towards a neural statistician" 2016, arXiv preprint arXiv. 13 Pages.
Finn, C., et al. "Model-agnostic meta-learning for fast adaptation of deep networks" 2017, 34th International Conference on Machine Learning. 13 Pages.
Gal, Y., et al. "Deep bayesian active learning with image data" 2017, arXiv preprint arXiv. 10 Pages.
Ganin, Y., et al. "Domain-adversarial training of neural networks." 2016, The Journal of Machine Learning Research, 17 (1). 35 Pages.
Goodfellow, I., et al. "Generative adversarial nets" 2014, In Advances in neural information processing systems. 9 Pages.
Grant, E., et al. "Recasting gradient based meta-learning as hierarchical bayes" 2018, arXiv preprint arXiv. 13 Pages.
He, K., et al. "Deep residual learning for image recognition" 2016, In Proceedings of the IEEE conference on computer vision and pattern recognition. 9 Pages.
Houthooft, R., et al. "Vime: Variational information maximizing exploration" 2016, In Advances in Neural Information Processing Systems. 9 Pages.
Kingma, D.P., et al. "Auto-encoding variational bayes" 2013, arXiv preprint arXiv. 14 Pages.
Kingma, D.P., et al. "Improving variational inference with inverse autoregressive flow" 2016, arXiv preprint arXiv. 10 Pages.
Kirkpatrick, J., et al. "Overcoming catastrophic forgetting in neural networks" Mar. 28, 2017, vol. 114, No. 13. Proceedings of the National Academy of Sciences (PNAS) . . . 6 Pages.
Krueger, D., et al." Bayesian hypernetworks" 2017, arXiv preprint arXiv. 12 Pages.
Lake, B. M., et al. "Building machines that learn and think like people" 2017, Behavioral and Brain Sciences 40. 72 Pages.
Louizos, C., et al. "Multiplicative normalizing flows for variational bayesian neural networks" 2017, Proceedings of the 34th International Conference on Machine Learning, arXiv preprint arXiv. 11 Pages.
Mishra, N., et al. "A simple neural attentive meta-learner" 2018, ICLR 2018. 17 Pages.
Munkhdalai, T., et al. "Rapid Adaptation with Conditionally Shifted Neurons" 2018, Proceedings of the 35th International Conference on Machine Learning, ICML 2018. 10 Pages.
Perez, E., et al. "FiLM: Visual Reasoning with a General Conditioning Layer" 2017, Association for the Advancement of Artificial Intelligence, arXiv preprint arXiv. 13 Pages.
Rasmussen, C. E. "Gaussian processes in machine learning" 2004, Machine Learning 2003, Springer. Berlin, Heidelberg. 9 Pages.
Ravi, S., et al. "Optimization as a model for few-shot learning" 2016, ICLR 2017. 11 Pages.
Snell, J., et al. "Prototypical networks for few-shot learning" 2017, 31st Conference on Neural Information Processing Systems (NIPS 2017). 11 Pages.
Snoek, J., et al. "Practical Bayesian Optimization of Machine Learning Algorithms" 2012, Advances in neural Information processing systems. 9 Pages.
Vinyals, O., et al. "Matching Networks for One Shot Learning" 2016, 30th Conference on Neural Information Processing Systems (NIPS 2016), Advances in Neural Information Processing Systems. 9 Pages.
Wan, J., et al. "Sparse bayesian multi-task learning for predicting cognitive outcomes from neuroimaging measures in alzheimer's disease" 2012, Computer Vision and Pattern Recognition (CVPR). IEEE 2012. 9 Pages.

* cited by examiner

MULTIPLE TASK TRANSFER LEARNING

RELATED APPLICATIONS

This application is a non provisional patent application which claims the benefit of U.S. provisional application No. 62/703,046 filed on Jul. 25, 2018.

TECHNICAL FIELD

The present invention relates to machine learning. More specifically, the present invention relates to transfer learning using multiple tasks, with results from multiple tasks being used in the accomplishment of other tasks related to the multiple tasks.

BACKGROUND

While conventional supervised learning is getting more stable and used in a wide range of applications, learning a complex model may require a daunting amount of labeled data. For this reason, transfer learning is often considered as an option to reduce the sample complexity of learning a new task. While there has been a significant amount of progress in domain adaptation, this particular form of transfer learning requires a source task highly related to the target task and a large amount of data on the source task. For this reason, it has been sought to make progress on multitask transfer learning (also known as few-shot learning), which is still far behind human level transfer capabilities. In the few-shot learning setup, a potentially large number of tasks are available to learn parameters shared across all tasks. Once the shared parameters are learned, the objective is to obtain good generalization performance on a new task with a small number of samples.

Recently, significant progress has been made to scale Bayesian neural networks to large tasks and to provide better approximations of the posterior distribution. This, however, comes with an important question: "What does the posterior distribution actually represent?" For neural networks, the prior is often chosen for convenience and the approximate posterior is often very limited. For sufficiently large datasets, the observations overcome the prior, and the posterior becomes a single mode around the true model, justifying most uni-modal posterior approximations.

However, many usages of the posterior distribution require a meaningful prior. That is, a prior that expresses a current knowledge of the task and, most importantly, a lack of knowledge regarding the task. In addition to that, a good approximation of the posterior under the small sample size regime is required, including the ability to model multiple modes. This is indeed the case for Bayesian optimization, Bayesian active learning, continual learning, safe reinforcement learning, exploration-exploitation trade-off in reinforcement learning. Gaussian processes have historically been used for these applications but using an Radial Basis Function (RBF) kernel is a too generic a prior for many tasks. More recent tools such as deep Gaussian processes show great potential but their scalability whilst learning from multiple tasks needs to be improved upon.

Based on the above, there is a need for systems and methods that overcome the shortcomings of the prior art and which provide advantages for learning and accomplishing tasks.

SUMMARY

The present invention provides systems and methods relating to multitask transfer learning. Neural networks are used to accomplish a number of tasks and the results of these tasks are used to determine parameters common to these and other tasks. These parameters can then be used to accomplish other related tasks. In the description, data fitting as well as image related tasks are used. Task conditioning, as well as the use of a KL regularizer, has greatly improved results when testing the methods of the invention.

In a first aspect, the present invention provides a method for accomplishing a first task, the method comprising:
  a) accomplishing a plurality of second tasks, each of said second tasks being related to said first task;
  b) compiling results from accomplishing said plurality of second tasks;
  c) using said results from said plurality of second tasks to determine parameters common to all of said plurality of second tasks and to said first task;
  d) using said parameters determined in step c) to accomplish said first task.

In a second aspect, the present invention provides a system for accomplishing a first task, the system comprising at least one neural network having a plurality of parameters, said plurality of parameters comprising parameters determined by use of results from accomplishing at least one second task, said first task being related to said at least one second task.

BRIEF DESCRIPTION OF THE DRAWINGS

The embodiments of the present invention will now be described by reference to the following figures, in which identical reference numerals in different figures indicate identical elements and in which:

FIG. 1A are results using the present invention while FIG. 1B are results using the prior art;

FIG. 2 is a graph detailing Mean Square Error on increasing dataset size with the baseline corresponding to the present invention with the KL regularizer not being used;

DETAILED DESCRIPTION

Figure 1A:
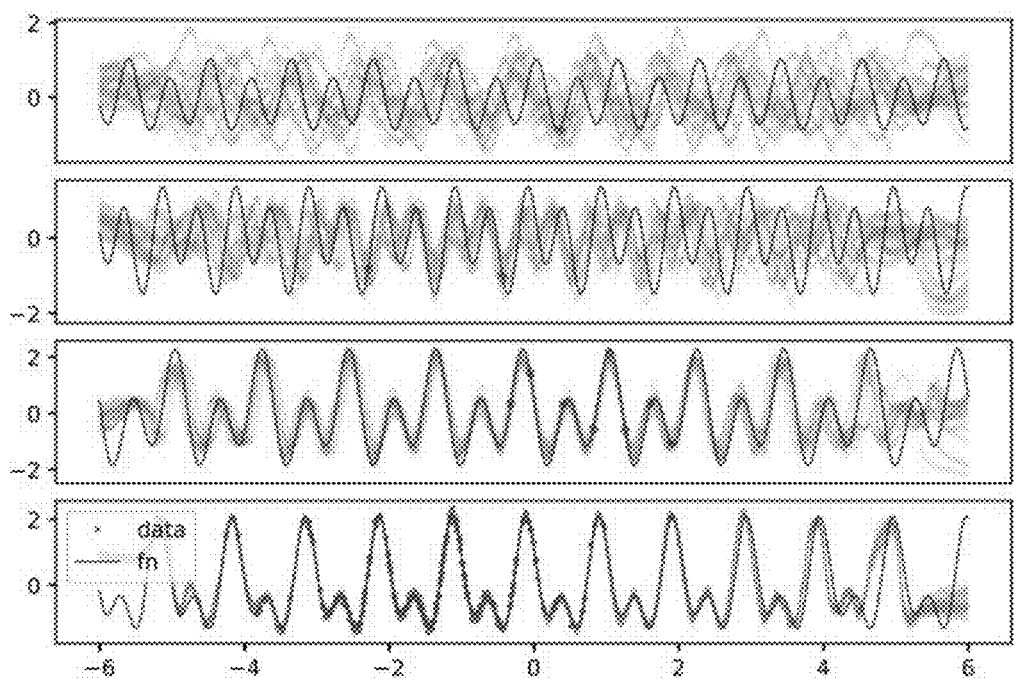
FIGS. 1A and 1B are images of a preview of a few tasks (blue line) with an increasing amount of training samples (red dots) and with samples from the posterior distribution being shown in semi-transparent colors.

The present invention seeks to learn a good prior across multiple tasks and to transfer the prior to a new task. To be able to express a rich and flexible prior learned across a large number of tasks, neural networks learned with a variational Bayes procedure are used. By doing so, the following have been achieved: (i) isolate a small number of task specific parameters and (ii) obtain a rich posterior distribution over this space. Additionally, the knowledge accumulated from the previous tasks provides a meaningful prior on the target task, yielding a meaningful posterior distribution which can be used in a small data regime. It should be clear that, for the explanation of the present invention, a "task" is defined as modeling the underlying distribution from a dataset of observations. Thus, the desired posterior distribution is to be predicted or determined based on the observations, each of which can be viewed as the result of a previous modeling exercise.

By leveraging the variational Bayes approach, it is shown that a system can learn a prior over models with neural networks. Also, by factorizing the posterior distribution into a task agnostic and task specific component, an important simplification that results in a scalable algorithm is shown and this is referred to in this document as a "deep prior" and which forms part of the present invention.

Hierarchical Bayes

It is first considered learning a prior from previous tasks by learning a probability distribution $p(w|\alpha)$ over the weights $w$ of a neural network parameterized by $\alpha$. This is done using a hierarchical Bayes approach across $N$ tasks, with hyper-prior $p(\alpha)$.

Each task has its own parameters $w_j$, with $=\{w_j\}_{j=1}^N$. Using all datasets $D=\{S_j\}_{j=1}^N$, one has the following posterior:

$$p(\mathcal{W}, \alpha | \mathcal{D}) = p(\alpha | \mathcal{D}) \prod_j p(w_j | \alpha, S_j) \propto p(\mathcal{D} | \mathcal{W}) p(\mathcal{W} | \alpha) p(\alpha) =$$

$$\prod_j \prod_i p(y_{ij} | x_{ij}, w_j) p(w_j | \alpha) p(\alpha),$$

For clarity, note that $p(x_{ij})$ cancelled with itself from the denominator since it does not depend on $w_j$ nor on $\alpha$. This would have been different for a generative approach.

In the above posterior, the term $p(y_{ij}|x_{ij},w_j)$ corresponds to the likelihood of sample $i$ of task $j$ given a model parameterized by $w_j$ e.g. the probability of class $y_{ij}$ from the softmax of a neural network parameterized by $w_j$ with input $x_{ij}$. For the posterior $p(\alpha|D)$, it is assumed that the large amount of data available across multiple tasks will be enough to overcome generic prior $p(\alpha)$ such as an isotropic Normal distribution. Hence, on can consider a point estimate of the posterior $p(\alpha|D)$ using maximum a posteriori. It should be clear that this can be done through simply minimizing the cross entropy of a neural network with L2 regularization.

The focus can now be shifted to the remaining term: $p(w_j|\alpha)$. Since $w_j$ is potentially high dimensional with intricate correlations among the different dimensions, we cannot use a simple Gaussian distribution. Following inspiration from generative models such as Generative Adversarial Networks (GANs) and variational autoencoders (VAEs), one can use an auxiliary variable $z \sim N(0, I_{d_z})$ and a deterministic function projecting the noise $z$ to the space of $w$ i.e. $w=h_\alpha(z)$.

Marginalizing $z$, this results in: $p(w|\alpha)=\int_z p(z)p(w|z,\alpha) dz = \int_z p(z)\delta_{h_\alpha(z)-w}dz$
where $\delta$ is the Dirac delta function. Unfortunately, directly marginalizing $z$ is intractable for a general $h_\alpha$. To overcome this issue, one can add $z$ to the joint inference and marginalize it at inference time. Considering the point estimation of $\alpha$, the full posterior is factorized as follows:

$$\prod_{j=1}^N p(w_j, z_j | \alpha, S_j) = \prod_{j=1}^N p(w_j | z_j, \alpha, S_j) p(z_j | \alpha, S_j) \propto \qquad (1)$$

$$\prod_{j=1}^N p(w_j | z_j, \alpha) p(z_j) \prod_{i=1}^{n_j} p(y_{ij} | x_{ij}, w_j),$$

where $p(y_{ij}|x_{ij}, w_j)$ is the conventional likelihood function of a neural network with weight matrices generated from the function $h_\alpha$ i.e.: $w_j=h_\alpha(z_j)$. Similar architecture has been used previously, but it will be shown below that it can be reduced to a simpler architecture in the context of multi-task learning. The other terms are defined as follows:

$$p(z_j) = \mathcal{N}(0,I) \qquad (2)$$

$$p(z_j, w_j | \alpha) = p(z_j)\delta_{h_\alpha(z_j)-w_j} \qquad (3)$$

$$p(z_j, w_j | \alpha, S_j) = p(z_j | \alpha, S_j)\delta_{h_\alpha(z_j)-w_j} \qquad (4)$$

The task will consist of jointly learning a function $h_\alpha$ common to all tasks and a posterior distribution $p(z_j|\alpha, S_j)$ for each task. At inference time, predictions are performed by marginalizing $z$ i.e.:

$$p(y|x, \mathcal{D}) = \mathbb{E}_{z_j \sim p(z_j|\alpha,S_j)} p(y|x, h_\alpha(z_j)).$$

Hierarchical Variational Bayes Neural Network

In the section above, there is described the different components for expressing the posterior distribution of Equation (4). While all those components are tractable, the normalization factor hidden behind the "$\propto$" sign is still intractable. To address this issue, one can follow the Variational Bayes approach.

Conditioning on $\alpha$, it can be seen in Equation (1) that the posterior factorizes independently for all tasks. This reduces the joint Evidence Lower BOund (ELBO) to a sum of individual ELBO for each task.

Given a family of distributions $q_{\theta_j}(z_j|S_j, \alpha)$, parameterized by $\{\theta_j\}_{j=}^N$ and $\alpha$, the Evidence Lower Bound for task $j$ is:

$$\ln p(S_j) \geq \mathbb{E}_{q(z_j, w_j|S_j, \alpha)} \sum_{i=1}^{n_j} \ln p(y_{ij} | x_{ij}, w_j) - KL_j = \qquad (5)$$

$$\mathbb{E}_{q_{\theta_j}(z_j|S_j,\alpha)} \sum_{i=1}^{n_j} \ln p(y_{ij} | x_{ij}, h_\alpha(z_j)) - KL_j = ELBO_j,$$

where $$KL_j = KL[q(z_j, w_j | S_j, \alpha) \| p(z_j, w_j | \alpha)] = \qquad (6)$$

$$\mathbb{E}_{q_{\theta_j}(z_j|S_j,\alpha)} \mathbb{E}_{q(w_j|z_j,\alpha)} \ln \frac{q_{\theta_j}(z_j | S_j, \alpha)}{p(z_j | \alpha)} \frac{\delta_{h_\alpha}(z_j) - w_j}{\delta_{h_\alpha}(z_j) - w_j} =$$

$$\mathbb{E}_{q_{s_j}(z_j|S_j,\alpha)} \ln \frac{q_{\theta_j}(z_j|S_j,\alpha)}{p(z_j | \alpha)} = KL[q_{\theta_j}(z_j | S_j, \alpha) \| p(z_j | \alpha)]$$

Notice that, after simplification, $KL_j$ is no longer over the space of $w_j$ but only over the space $z_j$. Namely, the posterior distribution is factored into two components, one that is task specific and one that is task agnostic and can be shared with the prior. This amounts to finding a low dimensional manifold in the parameter space where the different tasks can be distinguished. Then, the posterior $p(z_j|S_j, \alpha)$ only has to model which of the possible tasks are likely, given observations $S_j$ instead of modeling the high dimensional $p(w_j|S_j, \alpha)$.

But, most importantly, any explicit reference to $w$ has now vanished from both Equation (5) and Equation (6). This simplification has an important positive impact on the scalability of the approach. Since there is no longer a need to explicitly calculate the KL on the space of $w$, one can simplify the likelihood function to $(y_{ij}|x_{ij}, z_j, \alpha)$, which can be a deep network parameterized by $\alpha$, taking both $x_{ij}$ and $z_j$ as inputs. This contrasts with the previous formulation, where $h_\alpha(z_j)$ produces all the weights of a network, yielding an extremely high dimensional representation and slow training.

It should be noted that, for the simplification in Equation (6), the cancellation of the Dirac delta functions can be justified by considering a Gaussian with finite variance, $\epsilon$. For all $\epsilon>0$, the cancellation is valid, so letting $\epsilon \to 0$, the result can be recovered.

Posterior Distribution

For modeling $q_{\theta_j}(z_j|S_j, \alpha)$, one can use N $(\mu_j, \sigma_j)$, where $\mu_j$ and $\sigma_j$ can be learned individually for each task. This choice, however, limits the posterior family to express a single mode. For more flexibility, the usage of a more expressive posterior, such as Inverse Autoregressive Flow (IAF), can be explored. This gives a flexible tool for learning a rich variety of multivariate distributions. In principle, a different IAF for each task can be used, but for memory and computational reasons, a single IAF for all tasks is used and one can condition on an additional task specific context $c_j$. It should be clear that IAF are models or neural networks that may be used as noted above. It should also be clear that other models or neural networks other than IAF may be used and, as noted above, a different IAF may be used for each task. Using a different IAF for each task may take longer (i.e. more processing time) and it may take more resources but it may also provide useful results.

Note that with IAF, $q_{\theta_j}(z_j|S_j, \alpha)$ cannot be evaluated, for any values of z efficiently, only for those which were sampled, but this is sufficient for estimating the KL term with a Monte-Carlo approximation i.e.:

$$KL_j \approx \frac{1}{n_{mc}} \sum_{i=1}^{n_{mc}} \ln q_{\theta_j}(z_j^{(i)} | S_j, \alpha) - \ln \mathcal{N}(z_j^{(i)} | 0, 1),$$

where $z_j^{(i)} \sim q_{\theta_j}(z_j|S_j, \alpha)$. It is common to approximate $KL_j$ with a single sample and let the mini-batch average the noise incurred on the gradient. In experiments, $n_{mc}=10$ was used, but this did not significantly improve the rate of convergence.

As is well-known to those of skill in the art, the Kullback-Leibler (KL) divergence is used to measure the closeness between the desired posterior p and the approximate variational distribution q. To minimize this divergence (and hence move the approximate distribution q and the desired prior closer to each another), one maximizes the Evidence Lower BOund (ELBO) noted above.

Training Procedure

In order to compute the loss noted in Equation (5), every sample of every task would need to be evaluated. To accelerate the training, described is a procedure following the mini-batch principle. In this procedure, summations are first replaced with expectations:

$$ELBO = \sum_{j=1}^{N} \left( \mathbb{E}_{z_j \sim q_j} \sum_{i=1}^{n_j} \ln p(y_{ij} | x_{ij}, z_j) - KL_j \right) \quad (7)$$

$$= \mathbb{E}_{j \sim U_N} N \left( n_j \mathbb{E}_{z_j \sim q_j} \mathbb{E}_{i \sim U_{n_j}} \ln p(y_{ij} | x_{ij}, z_j) - KL_j \right)$$

Afterwards, it is sufficient to simply approximate the gradient with $n_{mb}$ samples across all tasks. Thus, all datasets can be concatenated into a meta-dataset and add j as an extra field. Then, sampling can be done uniformly $n_{mb}$ times with replacements from the meta-dataset. Notice the term $n_j$ appearing in front of the likelihood in Equation (7)—this indicates that, individually, for each task, it finds the appropriate trade-off between the prior and the observations. The algorithm below details the steps in this procedure.

```
1: for i in 1 .. n_mb:
2:   sample x, y and j uniformly from the meta dataset
3:   z_j, ln q(z_j) = IAF_α(μ_j, σ_j, c_j)
4:   KL_j ≈ ln q(z_j) − ln 𝒩(z_j|0, I_{d_z})
5:   ℒ_i = n_j lnp(y|x, z_j, α) + KL_j
```

Extending to Three Levels of Hierarchies

The present invention gives rise to a very flexible way to transfer knowledge from multiple tasks. However, there is still an important assumption at the heart of deep prior (and other VAE (variational autoencoder) based approaches such as, for example, in Edwards and Storkey), the task information must be encoded in a low dimensional variable z. In the Results section below, it is shown that, while it is appropriate for regression, for image classification, this is not the most natural assumption. Hence, as part of the present invention, the approach must be extended to a third level of hierarchy by introducing a latent classifier on the obtained representation.

In Equation (5), for a given task j, the likelihood p(S|z) is decomposed into $\prod_{i=1}^n p(y_i|x_i, z)$ by assuming that the neural network is directly predicting $p(y_i|x_i, z)$. Here, there is introduced a latent variable $v$ to make the prediction $p(y_i|x_i, v)$. This can be, for example, a Gaussian linear regression on the representation $\varphi_\alpha(x, z)$ produced by the neural network. Commonly called the marginal likelihood, the general form now factorizes as follows:

$$p(S|z) = \mathbb{E}_{v \sim p(v|z)} \prod_i p(y_i | v, x_i) p(x_i)$$

To compute $ELBO_j$ in Equation (5) and to update the parameters $\alpha$, the only requirement is to be able to compute the marginal likelihood p(S|z). There are closed form solutions for, e.g., linear regression with Gaussian prior, but the aim is to compare with algorithms such as Prototypical Networks (Proto Net) on a classification benchmark. Alternatively, the marginal likelihood can be factored as follows:

$$p(S|z) = \prod_{i=1}^n p(y_i|x_i, S_{0 \ldots i-1}, z).$$

If a well calibrated task uncertainty is not required, one can also use a leave one out procedure:

$$\prod_{i=1}^n p(y_i|x_i, S\{x_i,y_i\}, z).$$

Both of these factorizations correspond to training the latent classifier n times on a subset of the training set and evaluating the result on a left out sample.

For a practical algorithm, a closed form solution for leave one out in prototypical networks may be used. In its standard form, the prototypical network produces a prototype $c_k$ by averaging all representations $\gamma_i = \phi_\alpha(x_i, z)$ of class k i.e.

$$c_k = \frac{1}{|K|} \sum_{k \in K} \gamma_i,$$

where K={i: yi=k}. Then, predictions are made using $$p(y=k|x, \alpha, z) \propto \exp(-\|c_k - \gamma_i\|_2).$$

It should be clear that the above gives rise to the theorem that, given that $c_k^{-i} \forall k$ are prototypes computed without examples $x_i$, $y_i$ in the training set, then $$\|c_k^{-i} - \gamma_i\|_2 = \begin{cases} \frac{|K|}{|K|-1} \|c_k - \gamma_i\|_2 & \text{if } y_i = k \\ \|c_k - \gamma_i\|_2 & \text{otherwise} \end{cases} \qquad (8)$$

Because of this, one only needs to compute prototypes once and to rescale the Euclidean distance when comparing with a sample that was used for computing the current prototype. This results in an efficient algorithm with the same complexity as the original one. As well, what results is a good proxy for the marginal likelihood.

Results

Throughout the experiments, answers to the following questions were sought:
i) Can deep prior learn a meaningful prior on tasks?
ii) Can it compete against state of the art on a strong benchmark?
iii) In which situations deep prior and other approaches are failing?

Regression on One Dimensional Harmonic Signals

To gain a good insight into the behavior of the prior and posterior, a collection of one dimensional regression tasks was chosen. It is also sought to test the ability of the method to learn the task and not to simply match the observed points. For this, periodic functions were used and experiments to test the ability of the regressor to extrapolate outside of its domain were executed.

Specifically, each dataset consists of (x, y) pairs (noisily) sampled from a sum of two sine waves with different phase and amplitude and a frequency ratio of two: $f(x)=a_1 \sin(\omega \cdot x + b_1) + a_2 \sin(2 \cdot \omega \cdot x + b_2)$, where $y \sim N(f(x), \sigma_y^2)$. We construct a meta-training set of five thousand tasks, sampling $\omega \sim U(5, 7)$, $(b_1, b_2) \sim U(0, 2\pi)^2$ and $(a_1, a_2) \sim N(0, 1)^2$ independently for each task. To evaluate the system's ability to extrapolate outside of the task's domain, it is ensured that each task has a different domain. Specifically, x values are sampled according to N ($\mu_x$, 1), where $\mu_x$ is sampled from the meta-domain U(−4, 4). The number of training samples ranges from four to fifty for each task and evaluation is performed on one hundred samples from tasks never seen during training.

Model Once z is sampled from IAF, this is concatenated with x and a network of twelve densely connected layers of one hundred twenty eight neurons with residual connections between every other layer is used. The final layer linearly projects to two outputs $\mu_y$ and s, where s is used to produce a heteroskedastic noise, $\sigma_y$=sigmoid(s)·0.1+0.001. Finally, $p(y|x,z)=N(\mu_y(x,z), \sigma_y(x,z)^2)$ is used to express the likelihood of the training set. To help gradient flow, ReLU activation functions and Layer Normalization were used.

Results

FIG. 1A depicts examples of tasks with one, two, eight and sixty-four samples. The true underlying function is in blue while ten samples from the posterior distributions are faded in the background. The thickness of the line represents two standard deviations. The first plot has only one single data point and mostly represents samples from the prior, passing near this observed point. Interestingly, all samples are close to some parametrization of the equation for f(x) (the sum of the two sine waves) given above. Next with only two points, the posterior is starting to predict curves highly correlated with the true function. However, note that the uncertainty is over optimistic and that the posterior failed to fully represent all possible harmonics fitting those two points. Next, with eight points, it managed to mostly capture the task, with reasonable uncertainty. Finally, with sixty-four points the model is certain of the task.

Figure 1B:
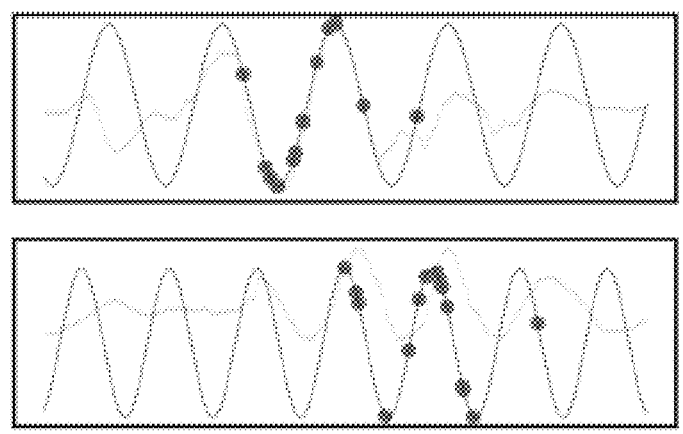

To add a strong baseline, experiments with MAML were executed. After exploring a variety of values for hyperparameter and architecture design, the results were less than perfect for the two harmonics meta-task. The meta-task was thus reduced to a single harmonic and, in addition, the base frequency range was reduced by a factor of two. With those simplifications, the results were still less than stellar when compared with those of the deep prior even in this simplified setup. FIG. 1B shows some form of adaptation with sixteen samples per task but the result is jittery and the extrapolation capacity is very limited. Those results were obtained with a densely connected network of eight hidden layers of sixty-four units, with residual connections every other layer. The training is performed with two gradient steps and the evaluation with five steps. To make sure that the implementation is valid, their regression result was first replicated with a fixed frequency.

Figure 2:
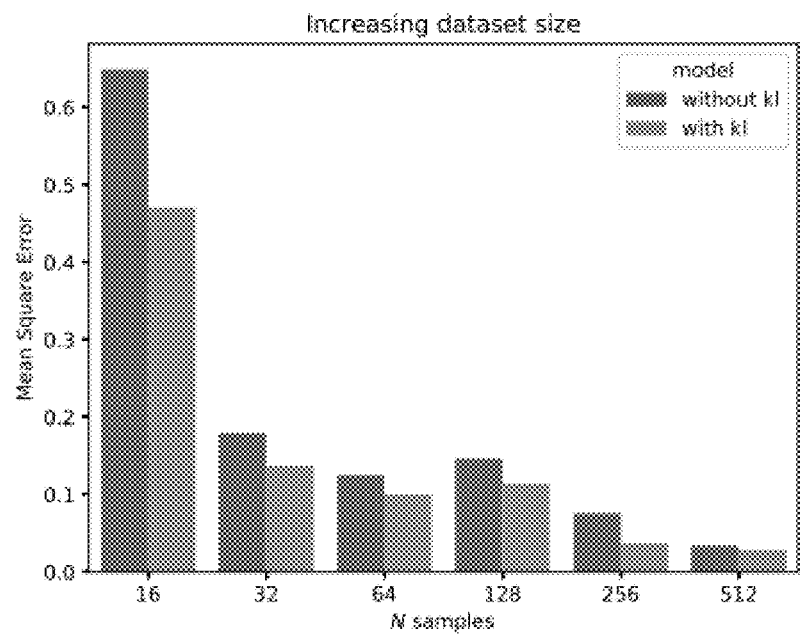
FIG. 2 shows the effect of using a KL regularizer.

Finally, to provide a stronger baseline, the KL regularizer portion of deep prior was removed and the posterior $q_{\theta_j}(z_j|S_j,\alpha)$ was reduced to a deterministic distribution centered on $\mu_j$. The mean square error is reported in FIG. 2 for an increasing dataset size. This highlights how the uncertainty provided by the present invention yields a systematic improvement.

Mini-Imagenet Experiment

Vinyals et al. used a subset of Imagenet to generate a benchmark for few-shot learning. Each task is generated by sampling five classes uniformly and five training samples per class, with the remaining images from the five classes being used as query images to compute accuracy. The number of unique classes sums to one hundred, each having six hundred examples of 84×84 images. To perform meta-validation and meta-tests on unseen tasks (and classes), sixteen and twenty classes respectively were isolated from the original set of one hundred, leaving sixty-four classes for the training tasks.

The training procedure mentioned above requires training on a fixed set of tasks. It was found that one thousand tasks yielded enough diversity and that, over nine thousand tasks, the embeddings are not being visited often enough over the course of the training. To increase diversity during training, the 5×5 training and test sets are re-sampled every time from a fixed train-test split of the given task.

In one experiment with a vanilla or plain version of deep prior, a ResNet network was used, where FILM layers were inserted between each residual block to condition on the task. Then, after flattening the output of the final convolution layer and reducing to 64 hidden units, a 64×5 matrix was applied, with the matrix being generated from a transformation of z. Finally, predictions were made through a softmax layer. It was found that this architecture was slow to train as the generated last layer was noisy for a long time and prevented the rest of the network to learn. Nevertheless, a 62.6% accuracy on Mini-Imagenet was obtained, on par with many strong baselines.

To enhance the model, task conditioning was combined with prototypical networks as noted in the section above relating to extending the present invention to a higher level of hierarchies. This approach alleviates the need to generate the final layer of the network, thus accelerating training and increasing generalization performances. While there is no longer a well calibrated task uncertainty, the KL term still acts as an effective regularizer and prevents overfitting on small datasets. With this improvement, an accuracy of 74.5% was achieved (see Table 1 below). In addition, an ablation study was also performed to highlight the contributions of the different components of the model. The results of this ablation study can be found in Table 2 below. It has been found that a deeper network with residual connections can yield major improvements. As well, it has also been found that task conditioning is preferably used the leave one out procedure. Finally, the use of the KL regularizer yields positive results, as can be seen from Table 1 below.

TABLE 1

Average classification accuracy on 5-shot Mini-Imagenet benchmark

| | Accuracy |
|---|---|
| Matching Networks [31] | 60.0% |
| Meta-Learner LSTM [28] | 60.6% |
| MAML [11] | 63.2% |
| Prototypical Networks [29] | 68.2% |
| SNAIL [24] | 68.9% |
| Discriminative k-shot [3] | 73.9% |
| adaResNet [25] | 71.9% |
| Deep Prior (Ours) | 62.7% |
| Deep Prior + Proto Net (Ours) | 74.5% |

TABLE 2

Ablation study of the model used with the present invention.

| | 5-way, 5-shot Mini-Imagenet | 4-way, 4-shot Synbols |
|---|---|---|
| Proto Net (ours) | 68.6 ± 0.5% | 69.6 ± 0.8% |
| +ResNet(12) | 72.4 ± 1.0% | 76.8 ± 0.4% |
| +Conditioning | 72.3 ± 0.6% | 80.1 ± 0.9% |
| +Leave One Out | 73.9 ± 0.4% | 82.7 ± 0.2% |
| +KL | 74.5 ± 0.5% | 83.5 ± 0.4% |

Figure 3:
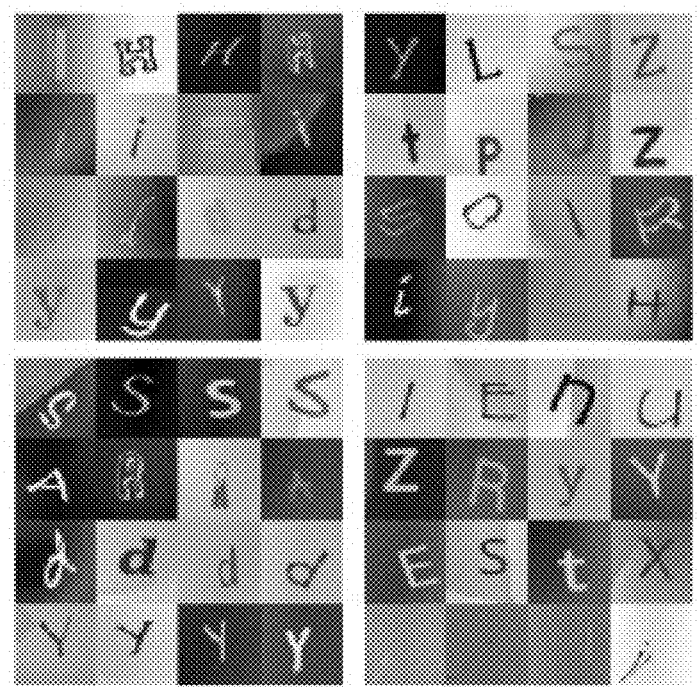
FIG. 3 shows a number of synthetic symbols used in a new benchmark. Each row is a class and each column is a sample from the classes. In the 2 left tasks, the symbols have to be predicted while in the two right tasks, the font has to be predicted.

In the Mini-Imagenet Experiment noted above, it was noted that conditioning helps, but that this only yields a minor improvement. This is due to the fact that Mini-Imagenet is a very homogeneous collection of tasks where a single representation is sufficient to obtain good results. To test this, a new benchmark of synthetic symbols (referred to as Synbols) was used. Images are generated using various font families on different alphabets (Latin, Greek, Cyrillic, Chinese) and background noise (see FIG. 3). For each task, the system has to predict either a subset of 4 font families or 4 symbols with only 4 examples. Predicting either fonts or symbols with two separate Prototypical Networks yields 84.2% and 92.3% accuracy respectively, with an average of 88.3% accuracy. However, blending the two collections of tasks in a single benchmark brings the results using a prototypical network down to 76.8% accuracy. Conditioning on the task with the present invention brings back the accuracy to 83.5%. While there is still room for improvement, this data shows that a single representation will only work on homogeneous collection of tasks and that task conditioning helps learning a family of representations suitable for heterogeneous benchmarks.

Figure 4:
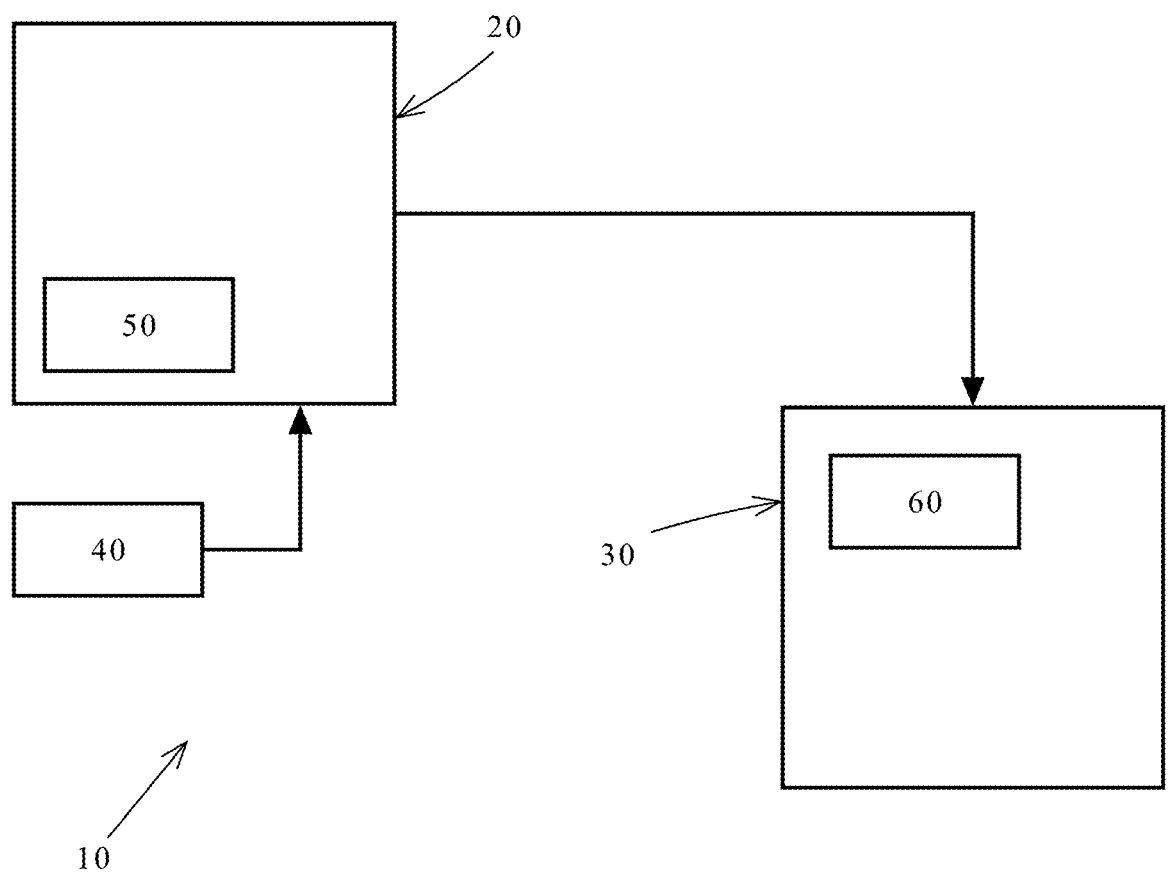
FIG. 4 is a block diagram schematically illustrating one aspect of the present invention.

Referring to FIG. 4, a block diagram that schematically illustrates the various aspects of the present invention is illustrated. As can be seen, the system 10 includes a first data processing device 20 and a second data processing device 30. The first data processing device 20 receives data 40 that is used to train a model 50 for accomplishing at least one task. The results from model 50 (such as the parameters and weights) can then be used on model 60 for accomplishing at least one second task. The model 60 is then trained using the second data processing device 30 along with the parameters from model 50. The first and second data processing devices 20 and 30 may be similar or they may differ in degree of complexity. As such, in one example, the first data processing device is a dedicated machine learning server with multiple GPUs while the second data processing device can be a less machine learning dedicated device such as a personal computer or a mobile device. Both data processing devices may include subsystems and software that implements neural networks that can be used for machine learning.

Of course, as can be imagined, the first data processing device can train the model 50 and the results can be used at a later time by the second data processing device.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, embodiments may be implemented in a procedural programming language (e.g. "C") or an object-oriented language (e.g. "C++", "java", "PHP", "PYTHON" or "C #") or in any other suitable programming language (e.g. "Go", "Dart", "Ada", "Bash", etc.). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A method for accomplishing a first task, the method comprising:
  a) accomplishing a plurality of second tasks, each of said second tasks being related to said first task;
  b) compiling results from accomplishing said plurality of second tasks;
  c) using said results from said plurality of second tasks to determine parameters common to all of said plurality of second tasks and to said first task;
  d) using said parameters determined in step c) to accomplish said first task.

2. The method according to claim 1, wherein step a) comprises using a plurality of neural networks to accomplish said plurality of second tasks.

3. The method according to claim 2, wherein similar neural networks are used to accomplish each of said plurality of second tasks.

4. The method according to claim 2, wherein different types of neural networks are used to accomplish each of said plurality of second tasks.

5. The method according to claim 2, wherein neural networks used to accomplish said first task are similar to neural networks used to accomplish said plurality of second tasks.

6. The method according to claim 1, wherein step c) comprises determining parameters used in a neural network for accomplishing one or more of said plurality of second tasks.

7. The method according to claim 1, wherein said plurality of second tasks and said first task are data fitting related tasks.

8. The method according to claim 1, further comprising using task conditioning to accelerate training of neural networks used in said method.

9. The method according to claim 1, further comprising training a latent classifier component on a subset of said results.

10. A system for accomplishing a first task, the system comprising:
  at least one processor;
  a non-transitory storage medium operatively connected to the at least one processor, the non-transitory storage medium comprising instructions, the at least one processor, upon executing the instructions, being configured for:
  receiving and compiling results from execution of a plurality of second tasks, each of said second tasks being related to said first task;
  determining, using said results from the execution of said plurality of second tasks, parameters common to all of said plurality of second tasks and to said first task;
  training at least one neural network to accomplish said first task using the parameters common to all of said plurality of second tasks, to obtain at least one trained neural network having a plurality of parameters, said plurality of parameters comprising parameters determined by use of results from accomplishing at least one second task, said first task being related to said at least one second task.

11. The system according to claim 10, wherein at least one second neural network is used to accomplish said at least one second task.

12. The system according to claim 11, wherein said at least one second neural network is executed on a second system different from said system.

13. The system according to claim 12, wherein said second system is a dedicated machine learning data processing system.

14. The system according to claim 13, wherein said parameters include weights used by said at least one neural network.

15. The system according to claim 10, wherein said first task and said at least one second task are data fitting related tasks.

16. The system according to claim 11, wherein said at least one neural network and said at least one second neural networks are similar neural networks.

* * * * *